(12) United States Patent
Botkin et al.

(10) Patent No.: US 7,291,669 B2
(45) Date of Patent: Nov. 6, 2007

(54) STABILIZED POLYOLEFIN COMPOSITIONS

(75) Inventors: James H. Botkin, Portland, ME (US); Urs L. Stadler, Madison, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 76 days.

(21) Appl. No.: 11/079,556

(22) Filed: Mar. 14, 2005

(65) Prior Publication Data

US 2005/0209379 A1    Sep. 22, 2005

Related U.S. Application Data

(60) Provisional application No. 60/553,406, filed on Mar. 16, 2004.

(51) Int. Cl.
*C08L 23/00* (2006.01)
*C08K 5/16* (2006.01)

(52) U.S. Cl. ............... 524/579; 524/583; 524/585; 524/236; 524/349; 524/351; 524/128; 524/123

(58) Field of Classification Search ........ 524/349, 524/247, 251, 228, 229, 747, 583, 585, 236, 524/351, 128, 579
See application file for complete search history.

(56) References Cited

U.S. PATENT DOCUMENTS

| | | | |
|---|---|---|---|
| 4,590,231 A | 5/1986 | Seltzer et al. | 524/100 |
| 4,649,221 A | 3/1987 | Ravichandran et al. | 564/300 |
| 4,668,721 A | 5/1987 | Seltzer et al. | 524/95 |
| 4,691,015 A | 9/1987 | Behrens et al. | 544/198 |
| 4,703,073 A | 10/1987 | Winter et al. | 524/99 |
| 4,782,105 A | 11/1988 | Ravichandran et al. | 524/236 |
| 4,797,438 A | 1/1989 | Kletecka et al. | 524/100 |
| 4,876,300 A * | 10/1989 | Seltzer et al. | 524/100 |
| 5,122,593 A | 6/1992 | Jennings et al. | 524/100 |
| 5,559,167 A | 9/1996 | Mahood | 523/136 |
| 5,596,033 A * | 1/1997 | Horsey et al. | 524/100 |
| 5,844,029 A | 12/1998 | Prabhu et al. | 524/236 |
| 5,880,191 A | 3/1999 | Prabhu et al. | 524/236 |
| 5,922,794 A | 7/1999 | Prabhu et al. | 524/236 |
| 6,172,153 B1 * | 1/2001 | Starsinic | 524/400 |
| 6,444,733 B1 * | 9/2002 | Stadler | 524/100 |
| 2002/0086924 A1 * | 7/2002 | King, III | 524/237 |

OTHER PUBLICATIONS

R. Gächter et al:, "Plastics Additives Handbook", Hanser Publishers, 4th Ed., pp. 40-71, 1993.

* cited by examiner

*Primary Examiner*—David W. Wu
*Assistant Examiner*—Rip A. Lee
(74) *Attorney, Agent, or Firm*—Tyler A. Stevenson

(57) ABSTRACT

Polyolefin compositions comprising a particular hindered phenolic antioxidant selected from the group consisting of tris(3,5-di-tert-butyl-4-hydroxybenzyl)isocyanurate, 1,3,5-tris-(3,5-di -tert-butyl-4-hydroxybenzyl)-2,4,6-trimethylbenzene and the calcium salt of the monoethyl ester of 3,5-di-tert-butyl-4-hydroxybenzylphosphonic acid, an oligomeric sterically hindered amine light stabilizer, a hydroxylamine stabilizer or trialkylamine N-oxide stabilizer, and, optionally, an organic phosphorus stabilizer, are effectively stabilized against degradation upon melt processing, long term heat aging, and exposure to combustion products of natural gas.

11 Claims, No Drawings

STABILIZED POLYOLEFIN COMPOSITIONS

This application claims benefit under 35 USC 119(e) of U.S. provisional application No. 60/553,406, filed Mar. 16, 2004.

The present invention relates to polyolefin compositions comprising a particular hindered phenolic antioxidant, at least one hydroxylamine or trialkylamine N-oxide stabilizer, at least one oligomeric sterically hindered amine light stabilizer, and, optionally, at least one organic phosphorus stabilizer, which compositions are effectively stabilized against degradation upon melt processing operations, end use at elevated temperatures, and exposure to combustion products of natural gas.

The use of stabilizer combinations of phosphites or phosphonites with sterically hindered phenols and/or sterically hindered amines (HALS) in polyolefins is known [see inter alia, R. Gachter, H. Muller, "Plastics Additives Handbook," Hanser Publishers, pages 40-71 (1990)].

U.S. Pat. No. 4,797,438 discloses polypropylene articles which are sterilized with gamma irradiation and stabilized with hindered amines of the class of polysubstituted piperazinones. U.S. Pat. No. 5,122,593 discloses polypropylene fibers stabilized against the harmful effects of gamma irradiation with the incorporation of an N-(substituted)-1-(piperazine-2-one alkyl)-alplha-(3,5-dialkyl-4-hydroxyphenyl)-alpha,alpha-substituted acetamide. U.S. Pat. No. 5,559,167 teaches a method for enhancing the resistance of polymeric articles to discoloration incurred by gamma irradiation with the incorporation of one of a particular class of phosphite stabilizers.

Hydroxylamine derivatives, such as N,N,-dialkylhydroxylamines and N,N-dibenzylhydroxylamine, are well known as useful stabilizers for a variety of polymeric substrates as is taught for example in U.S. Pat. Nos. 4,590,231, 4,668,721, 4,782,105 and 4,876,300, the relevant parts of which are incorporated herein by reference.

U.S. Pat. Nos. 4,649,221, 4,691,015 and 4,703,073 teach the use of polyhydroxylamine compounds, hydroxylamines derived from hindered amines and alkylated N,N-dibenzylhydroxylamine derivatives, respectively, with one or more compounds selected from the group of phenolic antioxidants, hindered amine light stabilizers, alkylated hydroxybenzoate light stabilizers, ultraviolet light absorbers, organic phosphorus compounds, alkaline metal salts of fatty acids and thiosynergists towards stabilizing polyolefins. All three patents teach that the polyolefin compositions are stabilized against degradation and/or discoloration upon exposure to heating at elevated temperatures, to the combustion products of natural gas, to gamma irradiation or to prolonged storage at ambient temperature.

U.S. Pat. No. 4,782,105 discloses the use of long chain N,N-dialkylhydroxylamines for the stabilization of poly (arylene sulfides) and unsaturated elastomers. Examples are shown where long chain N,N-dialkylhydroxylamines are used together with phosphite stabilizers in styrene/butadiene copolymer.

U.S. Pat. No. 4,876,300 discloses the use of long chain N,N-dialkylhydroxylamines as process stabilizers for polyolefin compositions. Examples are shown where long chain N,N-dialkylhydroxylamines are used together with phosphite stabilizers and also where they are used together with hindered amine stabilizers.

U.S. Pat. Nos. 4,590,231 and 4,668,721 disclose the use of N,N-dibenzylhydroxylamine or other hydroxylamine derivatives together with metal salts of fatty acids and phenolic antioxidants for the stabilization of polyolefin compositions. The compositions may also contain organic phosphorus compounds or hindered amine stabilizers. It is mentioned that the polyolefin compositions are stabilized against degradation and/or discoloration upon exposure to heating at elevated temperatures, to the combustion products of natural gas, to gamma irradiation or to prolonged storage at ambient temperature.

U.S. Pat. No. 5,596,033 discloses the stabilization of polypropylene fiber with a binary system of select hindered amines with the N,N-dialkylhydroxylamine produced by the direct oxidation of N,N-di(hydrogenated tallow)amine.

U.S. Pat. Nos. 5,844,029, 5,880,191 and 5,922,794 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

U.S. Pat. No. 6,444,733 discloses a process for the production of polyolefin hollow articles comprising organic phosphites, hydroxylamines, amine oxide derivatives, and hindered amine light stabilizers the relevant parts of which are incorporated herein by reference.

There remains a need to supply to the automotive industry fully formulated polyolefin feedstocks that can resist the deleterious effects of high temperature melt processing operations, end use at elevated temperatures, and exposure to combustion products of natural gas. Melt processing stability is important due to the increased use of in-plant recycling in the manufacture of plastic automotive parts. As a result of the recycling process, some resin used in the production of automotive parts can be subjected to multiple processing histories. Automotive manufacturers also routinely require long-term thermal stability (sometimes referred to as "thermal oxidative stability") testing at elevated temperatures (up to 150° C.) for interior and under-the-hood automotive components to simulate conditions encountered in end-use. Discoloration associated with the exposure of plastic parts to combustion gases (commonly referred to as "gas fading") is also of increasing concern to the industry. It has now been found that certain specific ternary stabilizer combinations satisfy this need. The stabilizer systems of the instant invention comprise at least one hindered phenolic antioxidant, at least one hydroxylamine or trialkylamine-N-oxide stabilizer, at least one oligomeric sterically hindered amine light stabilizer and, optionally, at least one organic phosphorus stabilizer.

DETAILED DISCLOSURE

The present invention relates to a polyolefin composition with improved discoloration resistance, said composition comprising a polyolefin which has incorporated therein a stabilizer system sufficient to attenuate the deleterious effects of melt processing, long-term thermal exposure, and exposure to combustion products of natural gas, said stabilizer system comprising at least one hindered phenolic antioxidant selected from the group consisting of tris(3,5-di-tert-butyl-4-hydroxybenzyl)isocyanurate, 1,3,5-tris-(3,5-di-tert-butyl-4-hydroxybenzyl)-2,4,6-trimethylbenzene and the calcium salt of the monoethyl ester of 3,5-di-tert-butyl-4-hydroxybenzylphosphonic acid, at least one compound selected from the group consisting of the oligomeric sterically hindered amine light stabilizers, at least one compound selected from the group consisting of the hydroxylamine stabilizers and
the amine oxide stabilizers; and
optionally, at least one compound selected from the group consisting of the organic phosphorus stabilizers.

The hindered phenolic antioxidants of the present invention are tris(3,5-di-tert-butyl-4-hydroxybenzyl)isocyanurate, CAS #27676-62-6, 1,3,5-tris-(3,5-di-tert-butyl-4-hydroxybenzyl)-2,4,6-trimethylbenzene, CAS # 1709-70-2 and the calcium salt of the monoethyl ester of 3,5-di-tert-butyl-4-hydroxybenzylphosphonic acid, CAS # 65140-91-2.

The hindered phenolic antioxidants are present in amounts of, for example, from about 0.01% to about 5% by weight, based on the weight of the polyolefin, from about 0.025% to about 1%, from about 0.05% to about 0.5% by weight, from about 0.01% to about 1%, from about 0.01% to about 0.5%, from about 0.025% to about 5%, or from about 0.05% to about 5% by weight, based on the weight of the polyolefin to be stabilized.

The sterically hindered amines of the present invention contain at least one group of the formula (I)

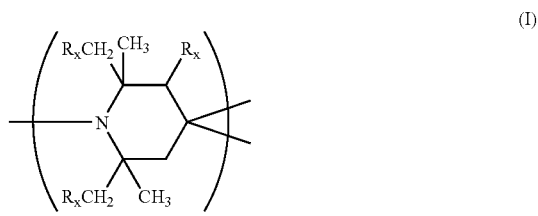

in which $R_x$ is hydrogen or methyl. The sterically hindered amines are for example, of high molecular weight and may be oligomeric mixtures.

For example, oligomeric sterically hindered amines are:

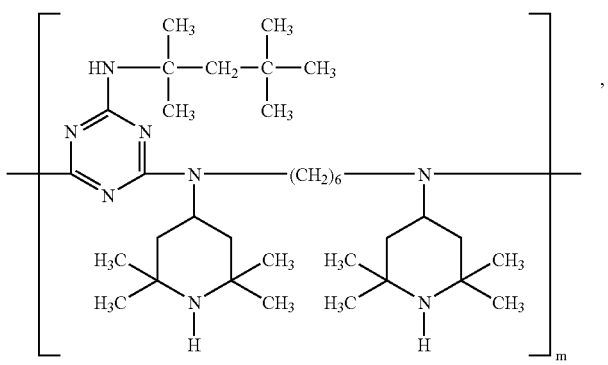

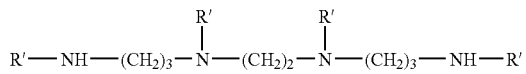

where R' is

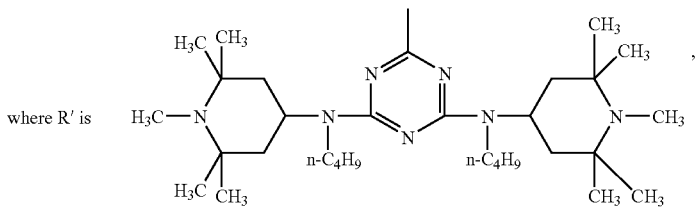

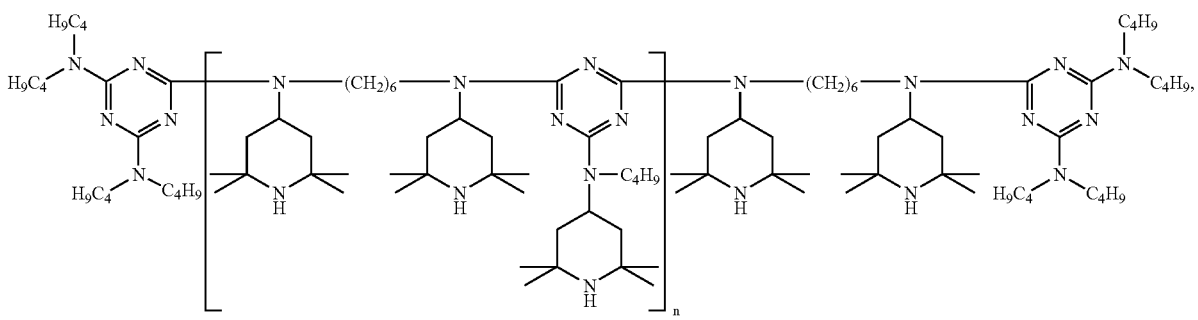

-continued
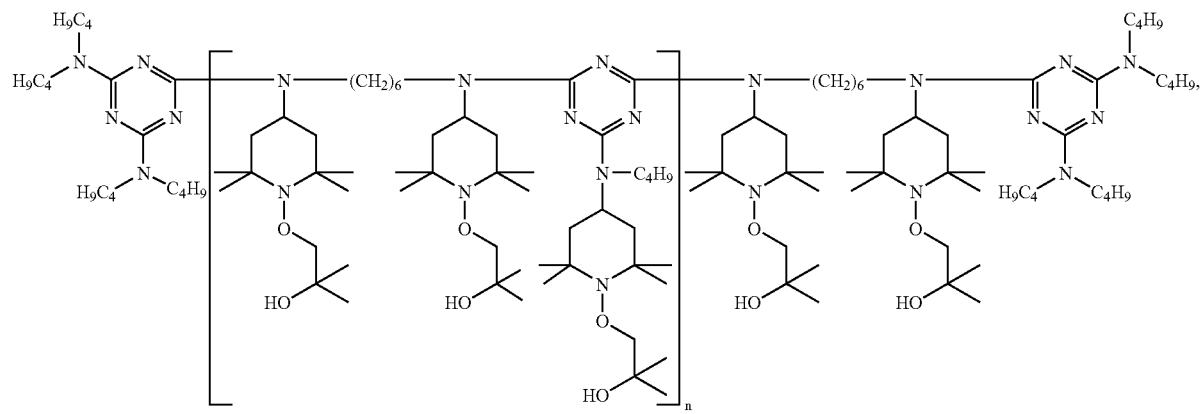
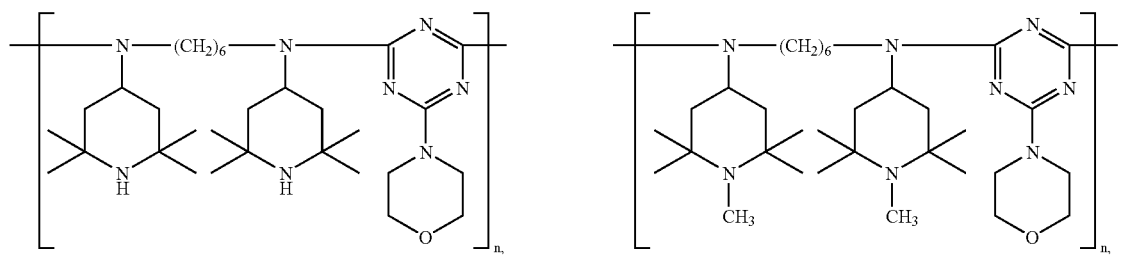
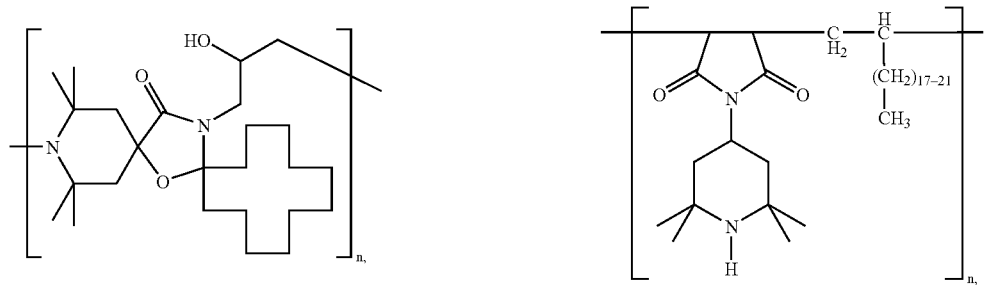
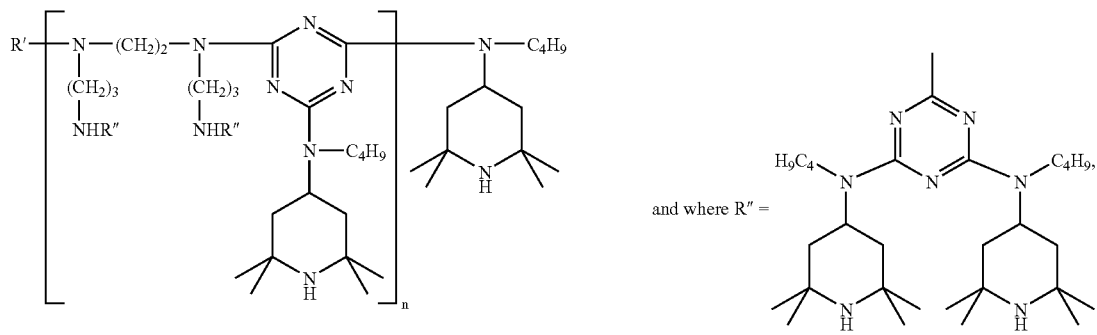
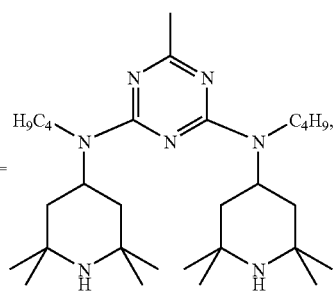
where R' = R'' or H -continued

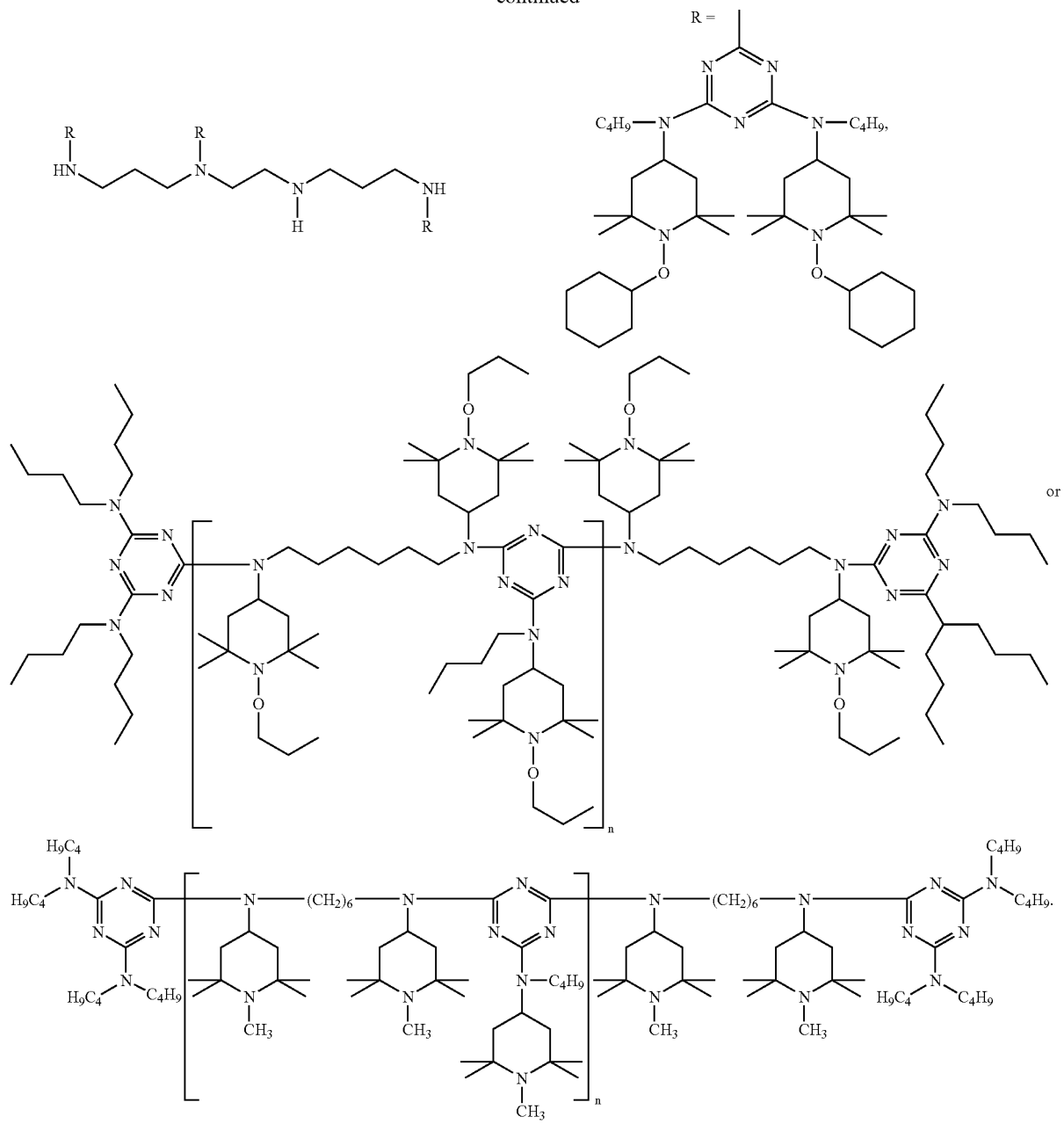

m and n are integers such that the total molecular weight of the oligomeric sterically hindered amine is above about 1000 g/mole.

The compounds of the oligomeric sterically hindered amine type are known and some are commercially available.

The oligomeric sterically hindered amines may be selected from those of the class of hydroxy-substituted N-alkoxy hindered amines, as disclosed in copending U.S. Pat. No. 6,392,041, hereby incorporated by reference.

The oligomeric sterically hindered amines are present for example, in amounts of from about 0.01% to about 10% by weight, based on the weight of the polyolefin, for example from about 0.05% to about 5%, from about 0.1% to about 1% by weight, from about 0.01% to about 5%, from about 0.01 to about 1%, from about 0.05% to 10%, or from about 0.1% to about 10% by weight, based on the weight of the polyolefin.

The term oligomeric refers to compounds having a molecular weight above about 1000 g/mole.

The hydroxylamine stabilizers employed in the novel compositions are of the formula (II)

where $R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbons atoms, halogen, cyano, $E_1O-$, $E_1CO-$, $E_1OCO-$, $E_1COO-$, $E_1S-$, $E_1SO-$, $E_1SO_2-$, $-NH_2$, $-NHE_1$, $-NE_1E_2$, $-PO(OE_1)(OE_2)$ or $-OPO(OE_1)(OE_2)$ groups;

$R_2$ is hydrogen or independently has the same meaning as $R_1$, where at least one of $R_1$ and $R_2$ contains a hydrogen alpha to the $-NOH$ moiety; or $R_1$ and $R_2$ together form a $C_{2-12}$ heterocyclic ring which contains at least one carbon substituted hydrogen alpha to the $-NOH$ moiety, where said $C_{2-12}$ heterocyclic ring is unsubstituted or is substituted by one to three three alkyl of 1 to 12 carbon atoms, perfluoroalkyl of 1 to 12 carbon atoms, halogen, cyano, $E_1O-$, $E_1CO-$, $E_1OCO-$, $E_1COO-$, $E_1S-$, $E_1SO-$, $E_1SO_2-$, $-NH_2$, $-NHE_1$, $-NE_1E_2$, $-PO(OE_1)(OE_2)$ or $-OPO(OE_1)(OE_2)$ groups; or where said $C_{2-12}$heterocyclic ring is interrupted by one to three $-O-$, $-NE_1-$, $-CO-$, $-CONE_1-$, $-S-$, $-SO-$, $-SO_2-$, $-COO-$, $-PO_3-$ or $-PO_4E_1$ groups; or where said heterocyclic ring is both substituted and interrupted by said groups;

$E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500.

The phrase "where at least one of $R_1$ and $R_2$ contains a hydrogen alpha to the $-NOH$ moiety" means that the present dialkylhydroxylamines are not di-tert-alkylhydroxylamines.

The hydroxylamine stabilizers employed in the novel compositions are, for example, N,N-dihydrocarbylhydroxylamines wherein $R_1$ and $R_2$ are independently benzyl, methyl, ethyl, octyl, lauryl, dodecyl, tetradecyl, hexadecyl, heptadecyl or octadecyl, or wherein $R_1$ and $R_2$ are each the alkyl mixture found in hydrogenated tallow amine.

The hydroxylamine stabilizers employed in the novel compositions are, for example, N,N-dihydrocarbylhydroxylamines selected from the group consisting of N,N-dibenzylhydroxylamine, N,N-dimethylhydroxylamine, N,N-diethylhydroxylamine, N,N-bis(2-hydroxypropyl)hydroxylamine, N,N-bis(3-hydroxypropyl)hydroxylamine, N,N-bis(2-carboxyethyl)-hydroxylamine, N,N-bis(benzylthiomethyl)hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine.

The hydroxylamine stabilizer may be for example the N,N-di(alkyl)hydroxylamine produced by the direct oxidation of N,N-di(hydrogenated tallow)amine. For example, the hydroxylamine prepared by direct hydrogen peroxide oxidation of bis(hydrogenated tallow alkyl) amines, that is N,N-di(hydrogenated tallow)hydroxylamine, CAS# 143925-92-2. N,N-di(hydrogenated tallow)hydroxylamine is prepared as in the working Examples of U.S. Pat. No. 5,013,510.

The amine oxide stabilizers are saturated tertiary amine oxides as represented by general formula (III):

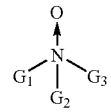

wherein $G_1$ and $G_2$ are independently a straight or branched chain alkyl of 6 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms;

$G_3$ is a straight or branched chain alkyl of 1 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms; with the proviso that at least one of $G_1$, $G_2$ and $G_3$ contains a beta carbon-hydrogen bond; and wherein said alkyl, aralkyl, alkaryl, cycloalkyl, alkcycloalkyl and cycloalkylalkyl groups may be interrupted by one to sixteen $-O-$, $-S-$, $-SO-$, $-SO_2-$, $-COO-$, $-OCO-$, $-CO-$, $-NG_4-$, $-CONG_4-$ and $-NG_4CO-$ groups, or wherein said alkyl, aralkyl, alkaryl, cycloalkyl, alkcycloalkyl and cycloalkylalkyl groups may be substituted by one to sixteen groups selected from $-OG_4$, $-SG_4$, $-COOG_4$, $-OCOG_4$, $-COG_4$, $-N(G_4)_2$, $-CON(G_4)_2$, $-NG_4COG_4$ and 5- and 6-membered rings containing the $-C(CH_3)(CH_2R_x)NL(CH_2R_x)(CH_3)C-$ group or wherein said alkyl, aralkyl, alkaryl, cycloalkyl, alkcycloalkyl and cycloalkylalkyl groups are both interrupted and substituted by the groups mentioned above; and wherein $G_4$ is independently hydrogen or alkyl of 1 to 8 carbon atoms;

$R_x$ is hydrogen or methyl;

L is a $C_{1-30}$ straight or branched chain alkyl moiety, a $-C(O)R$ moiety wherein R is a $C_{1-30}$ straight or branched chain alkyl group, or a $-OR$ moiety wherein R is a $C_{1-30}$ straight or branched chain alkyl group; and wherein said aryl groups may be substituted by one to three halogen, alkyl of 1 to 8 carbon atoms, alkoxy of 1 to 8 carbon atoms or combinations thereof.

Examples of structures of formula (III) are where $G_1$ and $G_2$ are independently benzyl or substituted benzyl. It is also possible for each of $G_1$, $G_2$, and $G_3$ to be the same residue. $G_1$ and $G_2$ may also independently be alkyl groups of 8 to 26 carbon atoms, for example alkyl groups of 10 to 26 carbon atoms. $G_3$ may be an alkyl group of 1 to 22 carbon atoms, for example methyl or substituted methyl. Also, the present amine oxides include those wherein $G_1$, $G_2$, and $G_3$ are the same alkyl groups of 6 to 36 carbon atoms. The aforementioned residues for $G_1$, $G_2$, and $G_3$ are, for instance, saturated hydrocarbon residues or saturated hydrocarbon residues containing at least one of the aforementioned $-O-$, $-S-$, $-SO-$, $-CO_2-$, $-CO-$, or $-CON-$ moieties. Those skilled in the art will be able to envision other useful residues for each of $G_1$, $G_2$, and $G_3$ without detracting from the present invention.

The saturated amine oxides may also include poly(amine oxides). By poly(amine oxide) is meant tertiary amine oxides containing at least two tertiary amine oxides per molecule. Illustrative poly(amine oxides), also called "poly(tertiary amine oxides)", include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles.

Also included as amine oxide stabilizers are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —CO$_2$—, —CO—, or —CONG$_4$— moiety. For instance, each tertiary amine oxide of the polymeric tertiary amine oxide may contain a C$_1$ residue.

The amine oxide stabilizers are used in amounts, in total, of about 0.0005% to about 2%, for example, from about 0.005% to about 1%, typically from about 0.01% to about 0.5% by weight, based on the weight of the polyolefin composition to be stabilized.

The amine oxide stabilizer is for example Genox™ EP, a di(C$_{16}$-C$_{18}$)alkyl methyl amine oxide, CAS# 204933-93-7, Crompton Corporation.

The organic phosphorus stabilizers are for example selected from the formulae (1), (2), (3), (4), (5), (6) and (7)

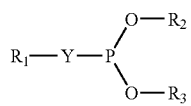
(1)

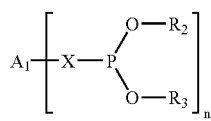
(2)

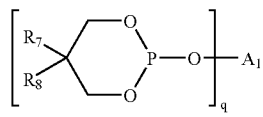
(3)

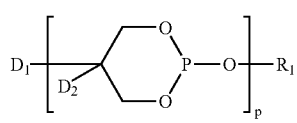
(4)

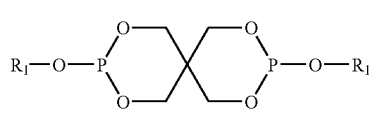
(5)

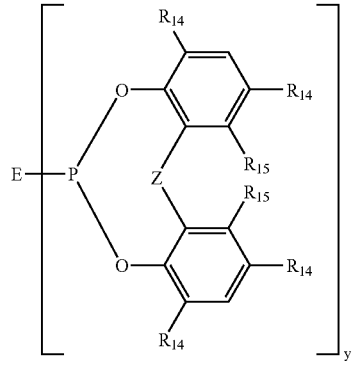
(6)

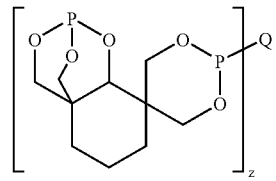
(7)

in which the indices are integral and n is 2, 3 or 4; p is 1 or 2; q is 2 or 3; r is 4 to 12; y is 1, 2 or 3; and z is 1 to 6;

A$_1$, if n is 2, is C$_2$-C$_{18}$ alkylene; C$_2$-C$_{12}$ alkylene interrupted by oxygen, sulfur or —NR$_4$—; a radical of the formula

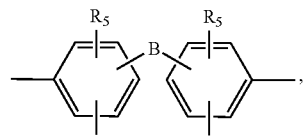

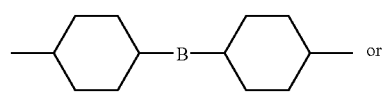

phenylene;

A$_1$, if n is 3, is a radical of the formula —C$_r$H$_{2r-1}$—;

A$_1$, if n is 4, is

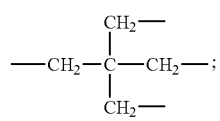

A$_2$ is as defined for A$_1$ if n is 2;

B is a direct bond, —CH$_2$—, —CHR$_4$—, —CR$_1$R$_4$—, sulfur, C$_5$-C$_7$cycloalkylidene, or cyclohexylidene which is substituted by from 1 to 4 C$_1$-C$_4$ alkyl radicals in position 3, 4 and/or 5;

D$_1$, if p is 1, is C$_1$-C$_4$ alkyl and, if p is 2, is —CH$_2$OCH$_2$—;

$D_2$, if p is 1, is $C_1$-$C_4$alkyl;

E, if y is 1, is $C_1$-$C_{18}$ alkyl, —$OR_1$ or halogen;

E, if y is 2, is —O-$A_2$-O—,

E, if y is 3, is a radical of the formula $R_4C(CH_2O$—$)_3$ or $N(CH_2CH_2O$—$)_3$;

Q is the radical of an at least z-valent alcohol or phenol, this radical being attached via the oxygen atom to the phosphorus atom;

$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

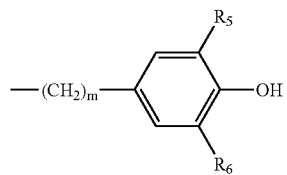

in which m is an integer from the range 3 to 6;

$R_4$ is hydrogen, $C_1$-$C_{18}$ alkyl, $C_5$-$C_{12}$ cycloalkyl or $C_7$-$C_9$ phenylalkyl, $R_5$ and $R_6$ independently of one another are hydrogen, $C_1$-$C_8$ alkyl or $C_5$-$C_6$ cycloalkyl, $R_7$ and $R_8$, if q is 2, independently of one another are $C_1$-$C_4$ alkyl or together are a 2,3-dehydropentamethylene radical; and $R_7$ and $R_8$, if q is 3, are methyl;

$R_{14}$ is hydrogen, $C_1$-$C_9$ alkyl or cyclohexyl, $R_{15}$ is hydrogen or methyl and, if two or more radicals $R_{14}$ and $R_{15}$ are present, these radicals are identical or different, X and Y are each a direct bond or oxygen, Z is a direct bond, methylene, —$C(R_{16})_2$— or sulfur, and $R_{16}$ is $C_1$-$C_8$alkyl.

Of interest are compositions wherein component (d) is at least one compound selected from the formulae (1), (2), (5) and (6), in which n is the number 2, and y is the number 1, 2 or 3;

$A_1$ is $C_2$-$C_{18}$ alkylene, p-phenylene or p-biphenylene,

E, if y is 1, is $C_1$-$C_{18}$ alkyl, —$OR_1$ or fluorine;

E, if y is 2, is p-biphenylene,

E, if y is 3, is $N(CH_2CH_2O$—$)_3$, $R_1$, $R_2$ and $R_3$ independently of one another are $C_1$-$C_{18}$ alkyl, $C_7$-$C_9$ phenylalkyl, cyclohexyl, phenyl, or phenyl substituted by 1 to 3 alkyl radicals having a total of 1 to 18 carbon atoms;

$R_{14}$ is hydrogen or $C_1$-$C_9$ alkyl, $R_{15}$ is hydrogen or methyl;

X is a direct bond,

Y is oxygen,

Z is a direct bond or —$CH(R_{16})$—, and $R_{16}$ is $C_1$-$C_4$ alkyl.

Likewise of interest are compositions wherein component (d) is at least one compound selected from the formulae (1), (2), (5) and (6), in which n is the number 2 and y is the number 1 or 3;

$A_1$ is p-biphenylene,

E, if y is 1, is $C_1$-$C_{18}$alkoxy or fluorine,

E, if y is 3, is $N(CH_2CH_2O$—$)_3$, $R_1$, $R_2$ and $R_3$ independently of one another are $C_1$-$C_{18}$ alkyl, or phenyl substituted by 2 or 3 alkyl radicals having a total of 2 to 12 carbon atoms;

$R_{14}$ is methyl or tert-butyl;

$R_{15}$ is hydrogen;

X is a direct bond;

Y is oxygen; and

Z is a direct bond, methylene or —$CH(CH_3)$—.

The organic phosphorus stabilizers in the present invention may be at least one compound selected from the formulae (1), (2) and (6).

The organic phosphorus stabilizers in the present invention may be at least one compound of the formula (VI)

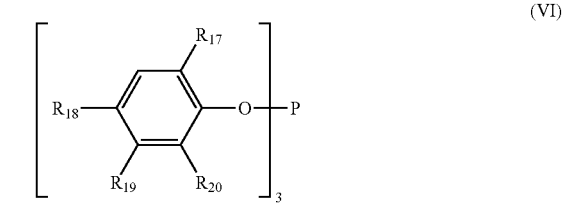

in which $R_{17}$ and $R_{18}$ independently of one another are hydrogen, $C_1$-$C_8$ alkyl, cyclohexyl or phenyl, and $R_{19}$ and $R_{20}$ independently of one another are hydrogen or $C_1$-$C_4$ alkyl.

The following compounds are examples of organic phosphites and phosphonites which are suitable organic phosphorus stabilizers:

Triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite (formula (D)), bis(2,6-di-tert-butyl-4-methylphenyl) pentaerythritol diphosphite (formula (E)), bisisodecyloxy-pentaerythritol diphosphite, bis(2,4-di-tert-butyl-6-methylphenyl)pentaerythritol diphosphite, bis (2,4,6-tri-tert-butylphenyl) pentaerythritol diphosphite, tristearyl sorbitol triphosphite, tetrakis (2,4-di-tert-butylphenyl) 4,4'-biphenylene-diphosphonite (formula (H)), 6-isooctyloxy-2,4,8,10-tetra-tert-butyl-dibenzo[d,f][1,3,2]dioxaphosphepin (formula (C)), 6-fluoro-2,4,8,10-tetra-tert-butyl-12-methyl-dibenzo[d,g][1,3,2]dioxaphosphocin (formula (A)), bis(2,4-di-tert-butyl-6-methylphenyl) methyl phosphite, bis(2,4-di-tert-butyl-6-methylphenyl)ethyl phosphite (formula (G)).

The following phosphites and phosphonites are suitable in the novel compositions:

Tris(2,4-di-tert-butylphenyl)phosphite, tris(nonylphenyl) phosphite,

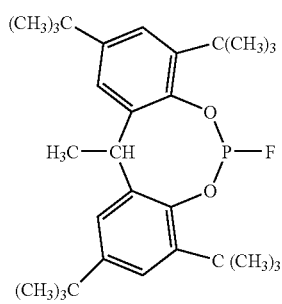
(A)
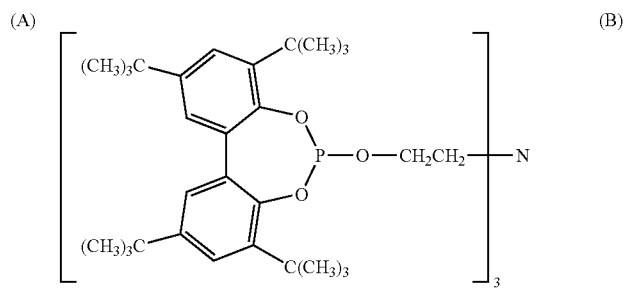
(B)
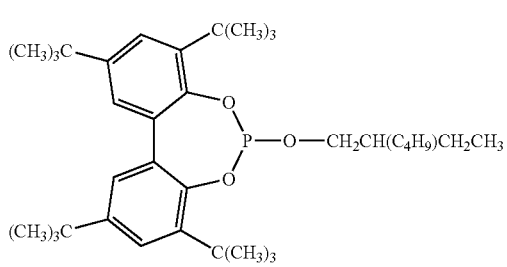
(C)
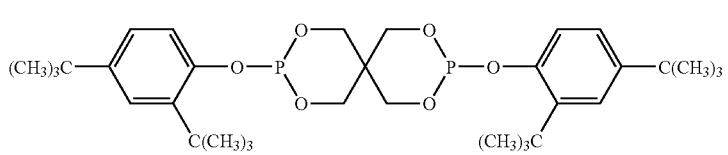
(D)
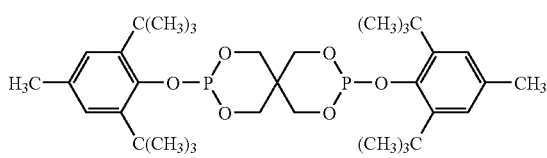
(E)
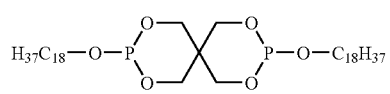
(F)
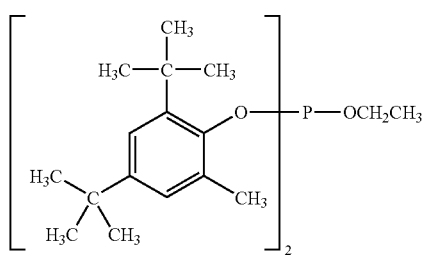
(G)
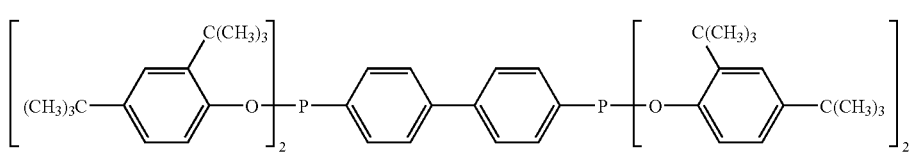
(H)
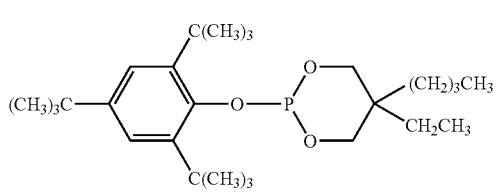
(J)

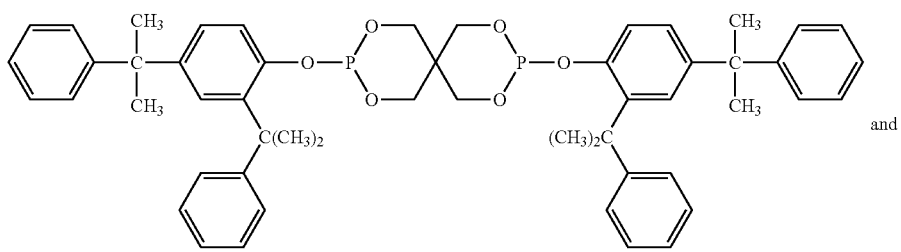

(K)

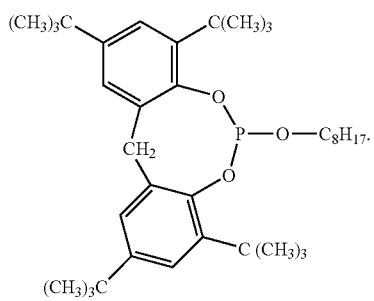

(L)

The organic phosphorus stabilizers in the novel compositions of the present invention may for example be: Tris(2,4-di-tert-butylphenyl)phosphite, bis(2,4-di-tert-butyl-6-methylphenyl)ethyl phosphite (formula (G)), bis(2,4-di-tert-butylphenyl)pentaerythritol diphosphite (formula (D)), tetrakis(2,4-di-tert-butylphenyl)4,4'-biphenylene-diphosphonite (formula (H)), 2,2',2"-nitrilo[triethyltris(3,3'5,5'-tetra-tert-butyl-1,1'-biphenyl-2,2'-diyl)phosphite] (formula (B)), formula (J), formula (K) or formula (L).

These organic phosphites and phosphonites are known compounds; many of them are commercially available.

The organic phosphorus stabilizers are used for example, in amounts of from about 0.01% to about 5% by weight, based on the weight of the polyolefin, from about 0.025% to about 1%, from about 0.05% to about 0.5% by weight, from about 0.01% to about 1%, about 0.01% to about 0.5%, about 0.025% to about 5%, or about 0.05% to about 5% by weight, based on the weight of the polyolefin to be stabilized.

The stabilizer system of the present invention may for example comprise at least one hindered phenolic antioxidant selected from the group consisting of tris(3,5-di-tert-butyl-4-hydroxybenzyl)isocyanurate, 1,3,5-tris-(3,5-di-tert-butyl-4-hydroxybenzyl)-2,4,6-trimethylbenzene, or the calcium salt of the monoethyl ester of 3,5-di-tert-butyl-4-hydroxybenzylphosphonic acid, at least one oligomeric sterically hindered amine stabilizer selected from the group consisting of

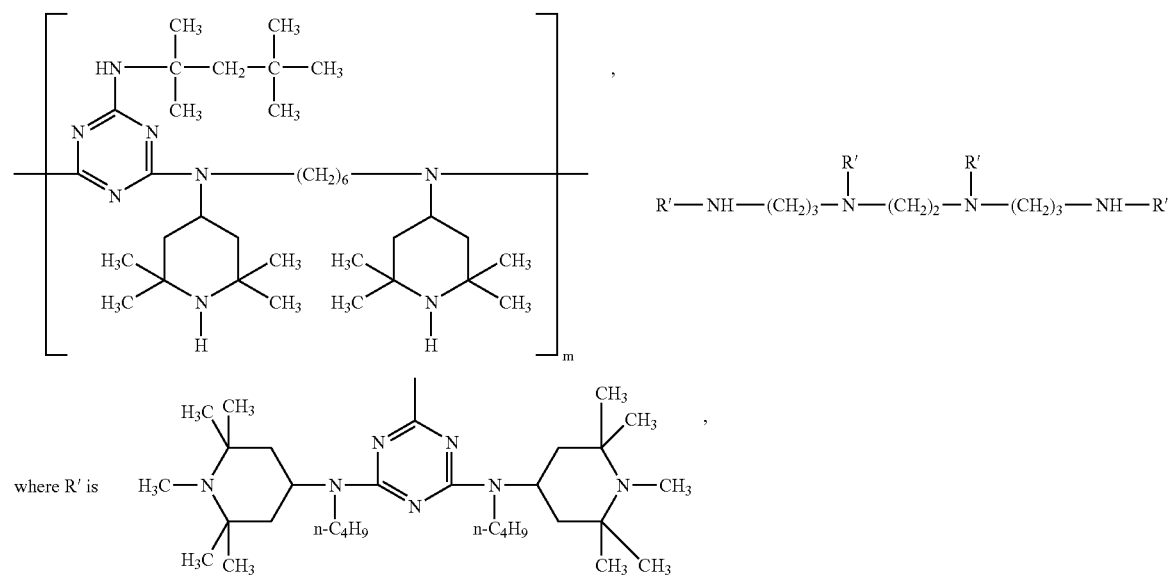

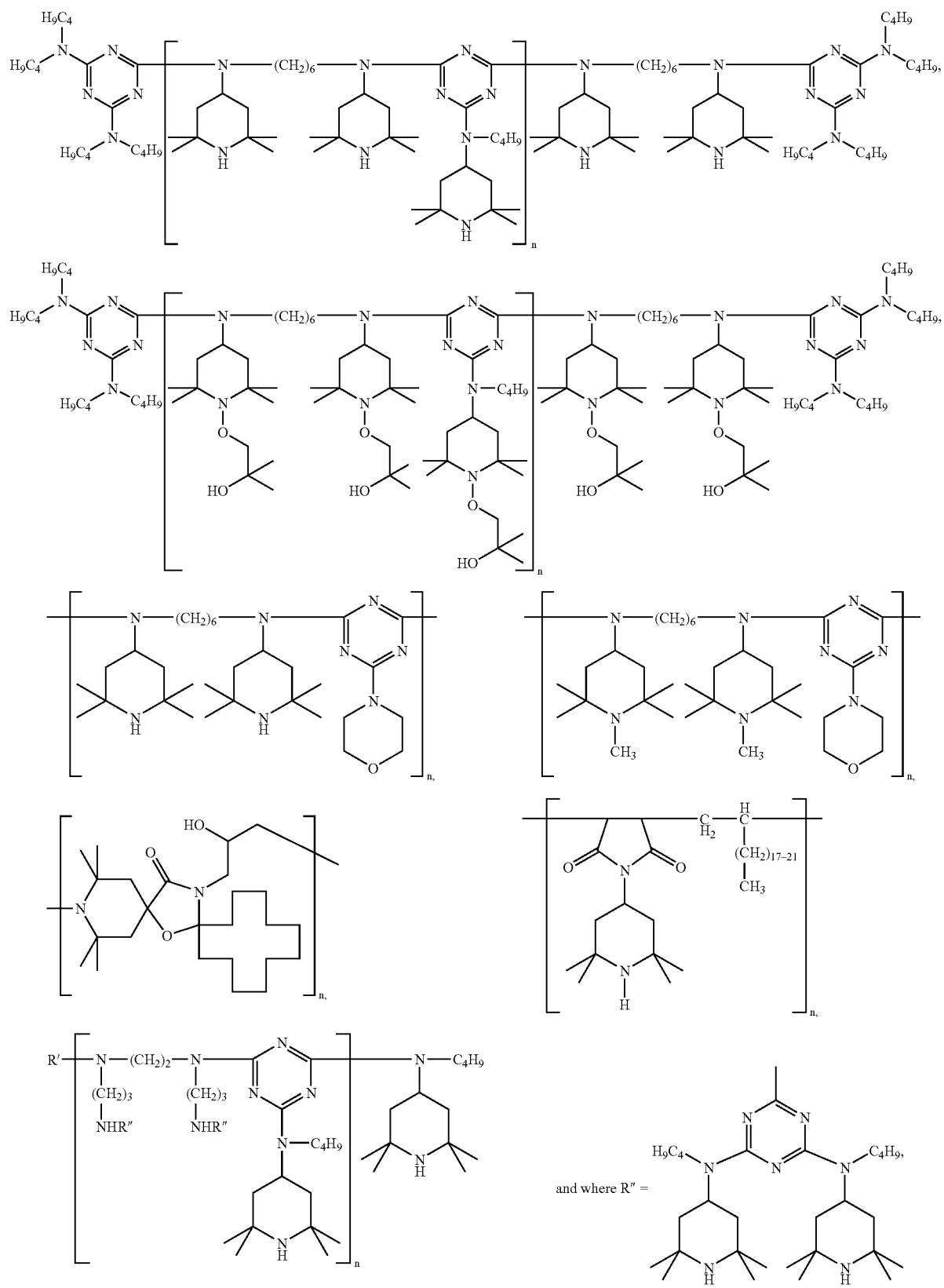

-continued

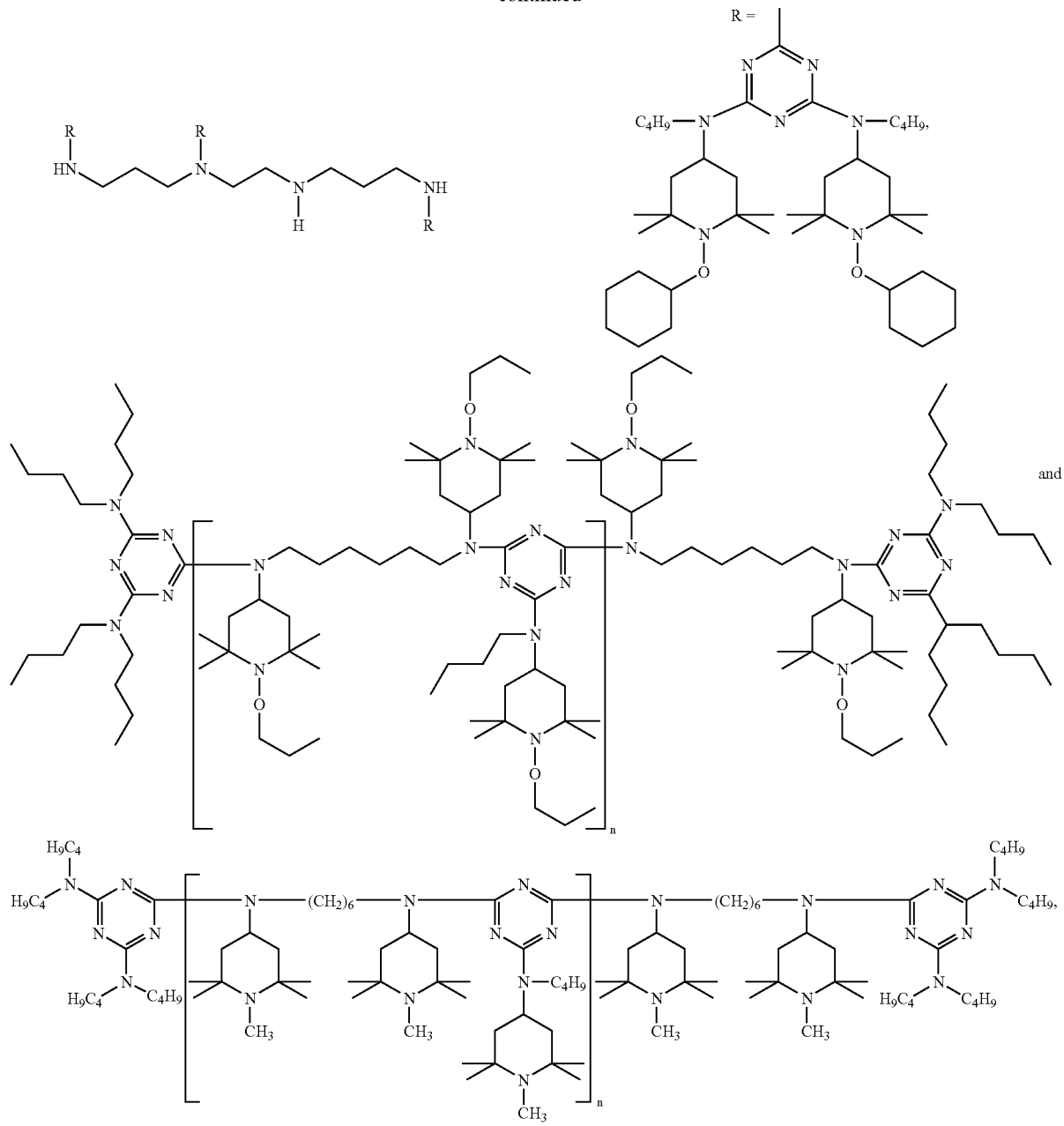

at least one compound selected from the group consisting of
the N,N-di(alkyl)hydroxylamine produced by the direct oxidation of N,N-di(hydrogenated tallow)amine and di($C_{16}$-$C_{18}$)alkyl methyl amine oxide, CAS# 204933-93-7, and optionally
tris(2,4-di-tert-butylphenyl)phosphite.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

4. Blends of polymers mentioned under 1.) with impact modifiers such as ethylene-propylene-diene monomer copolymers (EPDM), copolymers of ethylene with higher alpha-olefins (such as ethylene-octene copolymers), polybutadiene, polyisoprene, styrene-butadiene copolymers, hydrogenated styrene-butadiene copolymers, styrene-isoprene copolymers, hydrogenated styrene-isoprene copolymers. These blends are commonly referred to in the industry as TPO's (thermoplastic polyolefins).

Polyolefins of the present invention are for example polypropylene homo- and copolymers and polyethylene homo- and copolymers. For instance, polypropylene, high density polyethylene (HDPE), linear low density polyethylene (LLDPE) and polypropylene random and impact (heterophasic) copolymers. Preferred polyolefins of the present invention include polypropylene homopolymers, polypropylene impact (heterophasic) copolymers, blends thereof, and TPO's such as blends of polypropylene homopolymers and impact copolymers with EPDM or ethylene-alpha-olefin copolymers.

In addition to the present stabilizer system, the novel compositions may comprise further costabilizers (additives) such as, for example, the following:

1. UV absorbers 1.1 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987 and 5,977,219, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-alpha-cumyl-2-hydroxyphenyl)-2H-benzotriazole, 2-(3-t-butyl-2-hydroxy-5-(2-(ω-hydroxy-octa-(ethyleneoxy) carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-alpha-cumyl-5-t-octylphenyl)-2H-benzotriazole, 2-(2-hydroxy-3-t-octyl-5-alpha-cumylphenyl)-2H-benzotriazole, 5-fluoro-2-(2-hydroxy-3,5-di-alpha-cumylphenyl)-2H-benzotriazole, 5-chloro-2-(2-hydroxy-3,5-di-alpha-cumylphenyl)-2H-benzotriazole, 5-chloro-2-(2-hydroxy-3-alpha-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-alpha-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxy-hydrocinnamate, 5-butylsulfonyl-2-(2-hydroxy-3-alpha-cumyl-5-t-octylphenyl)-2H-benzotriazole, 5-trifluoromethyl-2-(2-hydroxy-3-alpha-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-alpha-cumylphenyl)-2H-benzotriazole, 5-butylsulfonyl-2-(2-hydroxy-3,5-di-t-butyl-phenyl)-2H-benzotriazole and 5-phenylsulfonyl-2-(2-hydroxy-3,5-di-t-butylphenyl)-2H-benzotriazole.

1.2 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

1.3 Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

1.4 Acrylates and malonates, for example, alpha-cyano-alpha,beta-diphenylacrylic acid ethyl ester or isooctyl ester, alpha-carbomethoxy-cinnamic acid methyl ester, alpha-cyano-beta-methyl-p-methoxy-cinnamic acid methyl ester or butyl ester, aplha-carbomethoxy-p-methoxy-cinnamic acid methyl ester, N-(beta-carbomethoxy-beta-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

1.5 Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

1.6 Tris-aryl-o-hydroxyphenyl-s-triazines, for example known commercial tris-aryl-o-hydroxyphenyl-s-triazines and triazines as disclosed in, WO 96/28431, EP 434608, EP 941989, GB 2,317,893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)-phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-alpha-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

2. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

3. Thiosynergists, for example, dilauryl thiodipropionate or distearyl thiodipropionate.

4. Peroxide scavengers, for example esters of b-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(b-dodecylmercapto)propionate.

5. Basic co-stabilizers, for example, melamine, polyvinylpyrrolidone, dicyandiamide, triallyl cyanurate, urea derivatives, hydrazine derivatives, amines, polyamides and polyurethanes.

6. Acid Scavengers, for example zinc oxide, calcium lactate, dihydrotalcite and alkali metal salts and alkaline earth metal salts of higher fatty acids for example calcium stearate, zinc stearate, magnesium behenate, magnesium stearate, sodium ricinoleate and potassium palmitate, antimony pyrocatecholate and zinc pyrocatecholate.

7. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; bisphenol phosphate salts such as the sodium and aluminum salts of 2,2'-methylene-bis-(4,6-di-tert-butylphenyl)phosphate (see U.S. Pat. No. 4,463,113); polymeric compounds such as ionic copolymers (ionomers) and zinc containing polymeric materials (see U.S. Pat. No. 5,475,123).

8. Clarifiers, for example substituted and unsubstituted bisbenzylidene sorbitols.

9. Fillers and reinforcing agents, for example, calcium carbonate, silicates, wollastonite, glass fibers, glass bulbs, asbestos, talc, kaolin, mica, barium sulfate, metal oxides and hydroxides, carbon black, graphite, wood flour and flours or fibers of other natural products, synthetic fibers.

10. Dispersing Agents, such as polyethylene oxide waxes or mineral oil.

11.1 Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetra-methylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetra-methylpiperidin-4-yl)glutarate and 2,4-bis{N-[1-(2-hydroxy-2-methylpropoxy)-2,2,6,6-tetra-methylpiperidin-4-yl]-N-butylamino}-6-(2-hydroxyethylamino)-s-triazine.

11.2. Sterically hindered amine stabilizers, [some of these are included in the invention] for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(l-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claims 10 or 38 or in Examples 1-12 or D-1 to D-5 therein.

12. Other additives, for example, plasticizers, lubricants, emulsifiers, pigments, rheology additives, catalysts, flow-control agents, optical brighteners, flameproofing agents, antistatic agents, and blowing agents.

The costabilizers are added, for example, in concentrations of from about 0.01% to about 10% by weight, based on the overall weight of the polyolefin to be stabilized.

The fillers and reinforcing agents (item 9 in the list), for example talc, calcium carbonate, mica or kaolin, are added to the polyolefins in concentrations of about 0.01% to about 40% by weight, based on the overall weight of the polyolefins to be stabilized.

The fillers and reinforcing agents (item 9 in the list), for example metal hydroxides, especially aluminum hydroxide or magnesium hydroxide, are added to the polyolefins in concentrations of about 0.01% to about 60% by weight, based on the overall weight of the polyolefins to be stabilized.

Carbon black as filler is added to the polyolefins in concentrations, judiciously, of from about 0.01% to about 5% by weight, based on the overall weight of the polyolefins to be stabilized.

Glass fibers as reinforcing agents are added to the polyolefins in concentrations, judiciously, of from about 0.01% to about 20% by weight, based on the overall weight of the polyolefins to be stabilized.

The present compositions and methods may comprise, in addition to the present stabilizer system, further additives as well, especially light stabilizers or processing stabilizers.

The incorporation of the present stabilizer system and optional further additives into the polyolefin is carried out by known methods, for example before or after molding or also by applying the dissolved or dispersed stabilizer mixture to the polyolefin, with or without subsequent evaporation of the solvent. The stabilizer system and optional further additives can also be added to the polyolefins to be stabilized in the form of a masterbatch which contains these components in a concentration of, for example, about 2.5% to about 25% by weight.

The present stabilizer system and optional further additives can also be added before or during the polymerization or before crosslinking.

The present stabilizer system and optional further additives can be incorporated into the polyolefin to be stabilized in pure form or encapsulated in waxes, oils or polymers.

The present stabilizer system and optional further additives can also be sprayed onto the polyolefin to be stabilized. They are able to dilute other additives (for example the conventional additives indicated above) or their melts so that they can be sprayed also together with these additives onto the polyolefin to be stabilized. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply the present stabilizer system optionally together with other additives, by spraying.

The polyolefin compositions according to the instant invention are useful in the manufacture of polyolefin

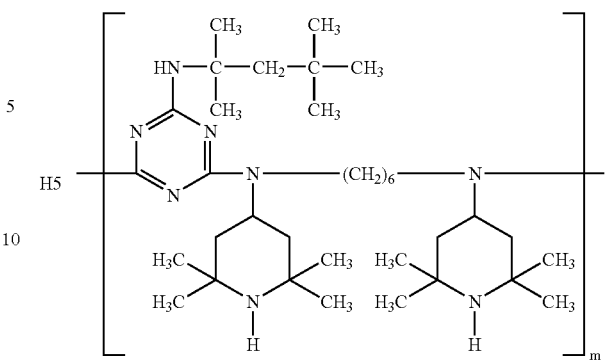

H8 bis(2,2,6,6-tetramethyl-4-piperidyl)sebacate

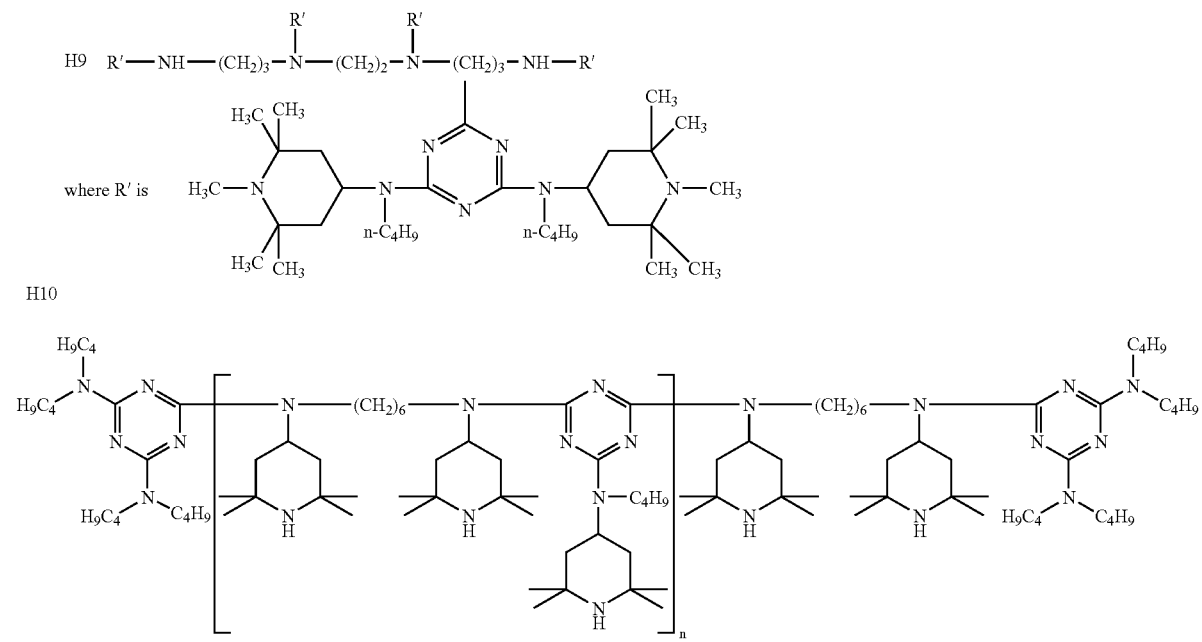

articles. The said articles are for example woven fibers, non-woven fibers, films, or molded articles.

Melt processing techniques are know and include for example extrusion, co-kneading, pultrusion, injection molding, co-extrusion, fiber extrusion, fiber spinning, film extrusion (cast, blown, blowmolding), rotational molding, and the like.

The following Examples illustrate the invention in more detail. They are not to be construed as limiting the instant invention in any manner whatsoever. The invention is declared to cover all changes and modifications of the specific examples which do not constitute departure from the spirit and scope of the invention. Parts and percentages are by weight unless otherwise indicated.

The formulations in the following Examples employ the following compounds:

AO-1 pentaerythritol tetrakis [3-(3,5-di-tert-butyl-4-hydroxyphenyl)propionate]

AO-2 tris(3,5-di-tert-butyl-4-hydroxybenzyl)isocyanurate

P-1 tris(2,4-di-tert-butylphenyl)phosphite

NOH the N,N-di(alkyl)hydroxylamine produced by the direct hydrogen peroxide oxidation of N,N-di(hydrogenated tallow)amine

EXAMPLE 1

Polypropylene Homopolymer and Long Term Heat Aging

The formulations of Table 1 are prepared by dry blending the appropriate additives with the polymer (Spheripol bulk process polypropylene homopolymer, nominal melt flow rate 4.16 dg/min) in a Turbula® blender for twenty minutes followed by melt compounding on a single screw extruder at 500° F. (260° C.) using a polyolefin screw fitted with a Maddock mixing section. Table 1 lists the amount of additives in parts per million (ppm) based on the overall formulation. Each formulation also contains 1000 ppm calcium stearate. Each blended sample is injection molded into Type IV tensile bars, 0.060 inch thick, using a BOY 50M with zone temperatures of 450, 465, and 475F and a nozzle temperature of 475F. The operating pressures are: injection pressure is 750 psig, holding pressure is 900 psig, and back pressure is 100 psig. The mold temperature is 76C.

TABLE 1

| Formulation | AO-1 | AO-2 | H8 | H9 | H10 | P-1 | NOH |
|---|---|---|---|---|---|---|---|
| A | — | 1000 | 2000 | 500 | — | — | 500 |
| B | — | 1000 | 2000 | 500 | — | 500 | 500 |
| C | — | 1000 | 2000 | — | 500 | 500 | 500 |
| D | — | 1000 | 2000 | — | — | 1000 | — |
| E | 1000 | — | 2000 | — | — | 1000 | — |
| F | — | 1000 | 2000 | — | — | — | 500 |
| G | — | 1000 | 2000 | — | — | 500 | 500 |
| H | — | — | 2000 | 1000 | — | — | 1000 |

Formulations D and E demonstrate the use of conventional stabilizer systems based on hindered phenols and phosphites alone.

Formulations F & G demonstrate the use of hindered phenols and hydroxylamines as exemplified in U.S. Pat. No. 4,590,231.

Formulation H demonstrates the use of N,N-dialkylhydroxylamines and sterically hindered amines as exemplified in U.S. Pat. No. 4,876,300.

Tensile bars are heat aged in a Blue M circulating air oven at 150° C. Samples are examined for brittleness by bending and visually for other signs of catastrophic failure, for example powder formation, localized discoloration, and cracking during aging, on a periodic basis. The number of days to catastrophic failure is reported in Table 2.

TABLE 2

| Formulation | Days until Failure |
|---|---|
| A | 26 |
| B | 25 |
| C | 22 |
| D | 7 |
| E | 19 |
| F | 8 |
| G | 9 |
| H | 5 |

The formulations of the present invention, A-C, show superior results with regard to physical property retention after thermal exposure, relative to the formulations known in the art, D-H.

EXAMPLE 2

Melt Processing Stability of Polypropylene Homopolymer: Color Control

The formulations of Table 3 are prepared by dry blending the appropriate additives with the polymer (Spheripol bulk process polypropylene homopolymer, nominal melt flow rate 4.16 dg/min) in a Turbula® blender for twenty minutes followed by melt compounding on a single screw extruder at 500° F. (260° C.) using a polyolefin screw fitted with a Maddock mixing section. Table 3 lists the amount of additives in parts per million (ppm) based on the overall formulation. Each formulation also contains 1000 ppm calcium stearate. The first and fifth pass extrusion pellets are taken separately and compression molded at 400F into test plaques having a thickness of 0.040 inches. The yellowness index, YI, is measured and reported in Table 4.

TABLE 3

| Formulation | AO-1 | AO-2 | H8 | H9 | H10 | P-1 | NOH |
|---|---|---|---|---|---|---|---|
| A | — | 1000 | 2000 | 500 | — | — | 500 |
| B | — | 1000 | 2000 | 500 | — | 500 | 500 |
| D | — | 1000 | 2000 | — | — | 1000 | — |
| E | 1000 | — | 2000 | — | — | 1000 | — |

YI is measured according to ASTM-1295-77 with a DCI SF600 spectrophotometer, large area view, spectral component included, C illuminant, 2° observer. Low YI values indicate less yellowing and is highly desired.

TABLE 4

| Formulation | YI after first pass | YI after fifth pass |
|---|---|---|
| A | 10.8 | 12.1 |
| B | 10.6 | 12.0 |
| D | 13.2 | 15.6 |
| E | 10.8 | 15.7 |

The formulations of the present invention, A and B, show superior results with regard to processing stability after multiple pass extrusion, relative to the formulations known in the art, D and E.

EXAMPLE 3

Melt Processing Stability of Polypropylene Homopolymer: Melt Flow Control

The formulations of Table 5 are prepared by dry blending the appropriate additives with the polymer (Spheripol bulk process polypropylene homopolymer, nominal melt flow rate 4.16 dg/min) in a Turbula® blender for twenty minutes followed by melt compounding on a single screw extruder at 500° F. (260° C.) using a polyolefin screw fitted with a Maddock mixing section. Table 5 lists the amount of additives in parts per million (ppm) based on the overall formulation. Each formulation also contains 1000 ppm calcium stearate. The first and fifth pass extrusion pellets are taken separately and the melt flow index (MFI) is measured and reported in Table 6.

TABLE 5

| Formulation | AO-1 | AO-2 | H8 | H9 | H10 | P-1 | NOH |
|---|---|---|---|---|---|---|---|
| B | — | 1000 | 2000 | 500 | — | 500 | 500 |
| D | — | 1000 | 2000 | — | — | 1000 | — |
| E | 1000 | — | 2000 | — | — | 1000 | — |
| H | — | — | 2000 | 1000 | — | — | 1000 |

Melt flow measurements are taken on a Tinius Olsen extrusion plastometer following ASTM D-1238. The conditions that are used are: 230° C., 6 minute preheat, 2.16 kg weight, and a double ¼" flag. Material from the first and fifth extrusion passes is used. The closer the melt flow rate after the fifth extrusion is to the melt flow rate after the first extrusion indicates superior process stabilization of the polypropylene.

TABLE 6

| Formulation | MFI after first pass (in grams/10 minutes) | MFI after fifth pass (in grams/10 minutes) |
|---|---|---|
| B | 3.7 | 4.9 |
| D | 3.4 | 5.0 |
| E | 3.7 | 5.6 |
| H | 3.9 | 5.4 |

The formulation of the present invention, B, shows comparable results with regard to processing stability after multiple pass extrusion, relative to the formulations known in the art, [D E, and H.

EXAMPLE 4

Gas Fade Resistance of Polypropylene Homopolymer

The formulations of Table 7 are prepared by dry blending the appropriate additives with the polymer (Spheripol bulk process polypropylene homopolymer, nominal melt flow rate 4.16 dg/min) in a Turbula® blender for twenty minutes followed by melt compounding on a single screw extruder at 500° F. (260° C.) using a polyolefin screw fitted with a Maddock mixing section. Table 7 lists the amount of additives in parts per million (ppm) based on the overall formulation. Formulation A, B, & E also contain 1000 ppm calcium stearate while formulation I & J contain 500 ppm calcium stearate. The fifth pass extrusion pellets are taken and compression molded at 400F into test plaques having a thickness of 0.040 inches. The test plaques are exposed to an atmospheric fume chamber according to AATCC test method 23-1988. The change in color, Delta E (DE), is measured after seven cycles and reported in Table 8. Lower DE values indicate less discoloration and less color which is highly desirable.

TABLE 7

| Formulation | AO-1 | AO-2 | H8 | H9 | H10 | P-1 | NOH | H5 |
|---|---|---|---|---|---|---|---|---|
| A | — | 1000 | 2000 | 500 | — | — | 500 | — |
| B | — | 1000 | 2000 | 500 | — | 500 | 500 | — |
| E | 1000 | — | 2000 | — | — | 1000 | — | — |
| I | 500 | — | 1000 | — | — | 500 | — | 1000 |
| J | 500 | — | 1000 | — | — | 750 | 250 | 1000 |

CIEL*a*b coordinates before and after exposure, seven cycles, are measured using X-Rite 938 Spectrodensitometer. The change in color is given by Delta E (DE) which is calculated by:

$$DE=[(DL^*)^2+(Da^*)^2+(Db^*)^2]^{1/2}$$

DL is the change in the L value between initial and final reading.

Da is the change in the a value between initial and final reading.

Db is the change in the b value between initial and final reading.

TABLE 8

| Formulation | DE after seven cycles |
|---|---|
| A | 0.8 |
| B | 0.8 |
| E | 3.8 |
| I | 3.0 |
| J | 2.7 |

From the results given in Table 8, it is seen that the instant compositions, A and B, are less sensitive to discoloration from atmospheric pollutants than the other compositions, E, I, and J.

EXAMPLE 5

Retention of Physical Properties of Polypropylene Homopolymer for Fiber

Polypropylene homopolymer, Ti/Al catalyst, bulk phase process, with a nominal melt flow index of ca. 15 dg/min at 2.16 kg/230° C. is extruded into fibers at 525° F. and a draw ratio of 3.5:1 and 15 Denier per filament. The fibers are knitted into socks. Samples are also compression molded into plaques. The individual formulations each contain a 1:1 blend of calcium stearate/dihydrotalcite at a total level of 500 ppm as an acid scavenger. Formulations are prepared as per Example 1.

The formulations of the present invention show superior color and/or physical property retention relative to formulations representing the current state-of-the-art containing hindered amine/phosphite combinations.

EXAMPLE 6

Retention of Physical Properties of Linear Low Density Polyethylene for Film

Unipol®, Union Carbide Corporation, gas phase E/H LLDPE copolymer; Ti/Al catalyst; melt index ca. 1 dg/min. at 2.16 kg/190° C. is extruded into blown films at 450° F. to produce 1.5 mil films. The individual formulations each contain zinc stearate at a total level of 500 ppm as an acid scavenger. Formulations are prepared as per Example 1.

The films containing the formulations of the present invention show superior physical property and color retention relative to formulations representing the current state-of-the-art containing hindered amine/phosphite combinations.

What is claimed is:
1. A polyolefin composition of improved discoloration resistance comprising
   a polyolefin which has incorporated therein a stabilizer system sufficient to attenuate the deleterious effects of melt processing, long term heat aging, and exposure to combustion products of natural gas, said stabilizer system comprising
   i) at least one hindered phenolic antioxidant selected from the group consisting of tris(3,5-di-tert-butyl-4-hydroxybenzyl) isocyanurate, 1,3,5-tris-(3,5-di-tert-butyl-4-hydroxybenzyl)-2,4,6-trimethylbenzene and the calcium salt of the monoethyl ester of 3,5-di-tert-butyl-4-hydroxybenzylphosphonic acid, ii) at least one compound selected from the group consisting of oligomeric sterically hindered amine light stabilizers having a molecular weight above about 1000 g/mole, iii) dioctadecyl methyl amine oxide, and optionally, iv) at least one compound selected from the group consisting of the organic phosphorus stabilizers, where the phenolic antioxidants i) are incorporated from about 0.01% to about 5% by weight, the oligomeric sterically hindered amine stabilizers ii) are incorporated from about 0.05% to about 5% by weight, the dioctadecyl methyl amine oxide iii) is incorporated from about 0.0005% to about 2% by weight, and optionally the organic phosphorus stabilizers iv) are incorporated from about 0.01% to about 5% by weight, each based on the weight of the polyolefin.

2. A polyolefin composition according to claim 1 wherein the polyolefin is polypropylene or polyethylene.

3. A polyolefin composition according to claim 2 wherein the polyolefin is a polypropylene homopolymer or impact (heterophasic) copolymer.

4. A polyolefin composition according to claim 1 wherein the hindered phenolic antioxidant is tris(3,5-di-tert-butyl-4-hydroxybenzyl) isocyanurate.

5. A polyolefin composition according to claim 1 wherein the oligomeric sterically hindered amine stabilizers contain at least one group of the formula (I)

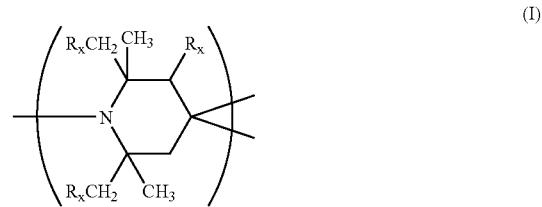

in which $R_x$ is hydrogen or methyl.

6. A polyolefin composition according to claim 5 in which the oligomeric sterically hindered amine stabilizers are selected from the group consisting of

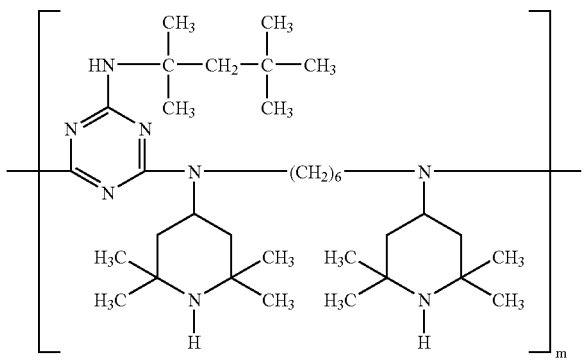

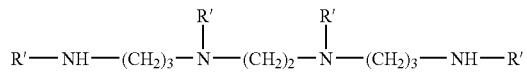

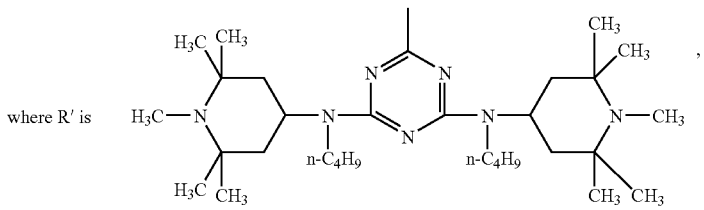

where R' is

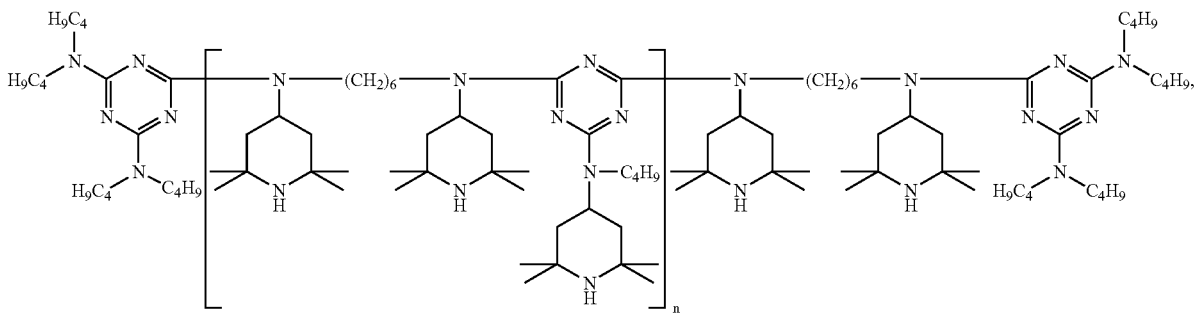

-continued
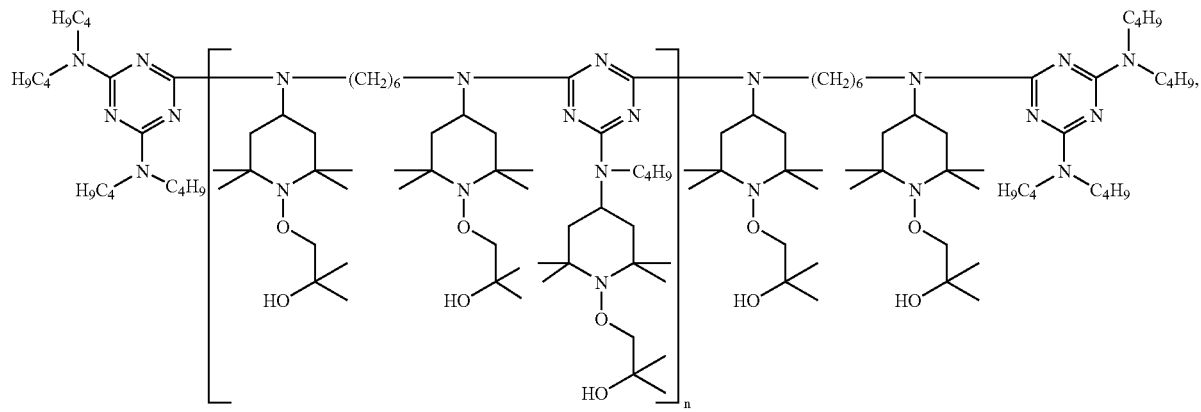
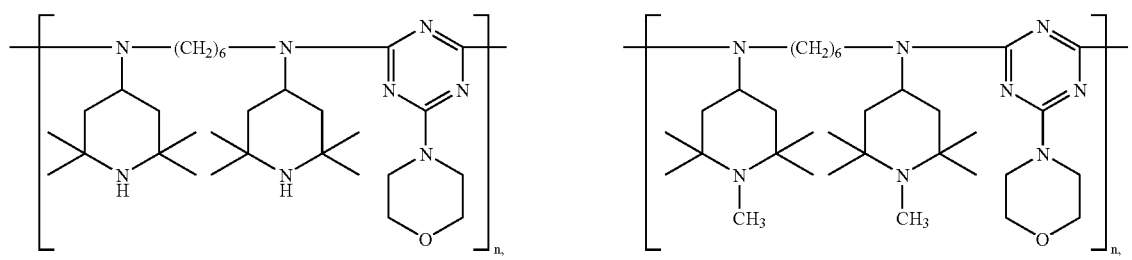
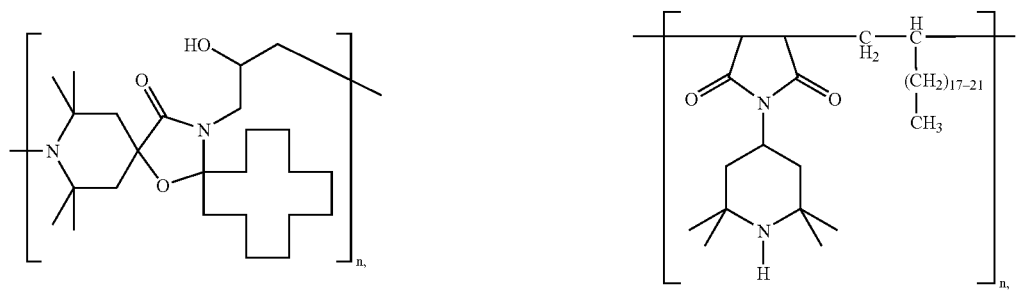
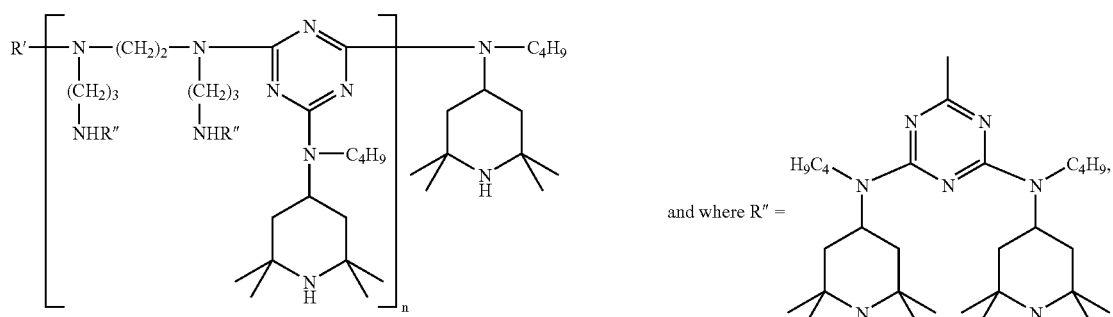
where R' = R" or H

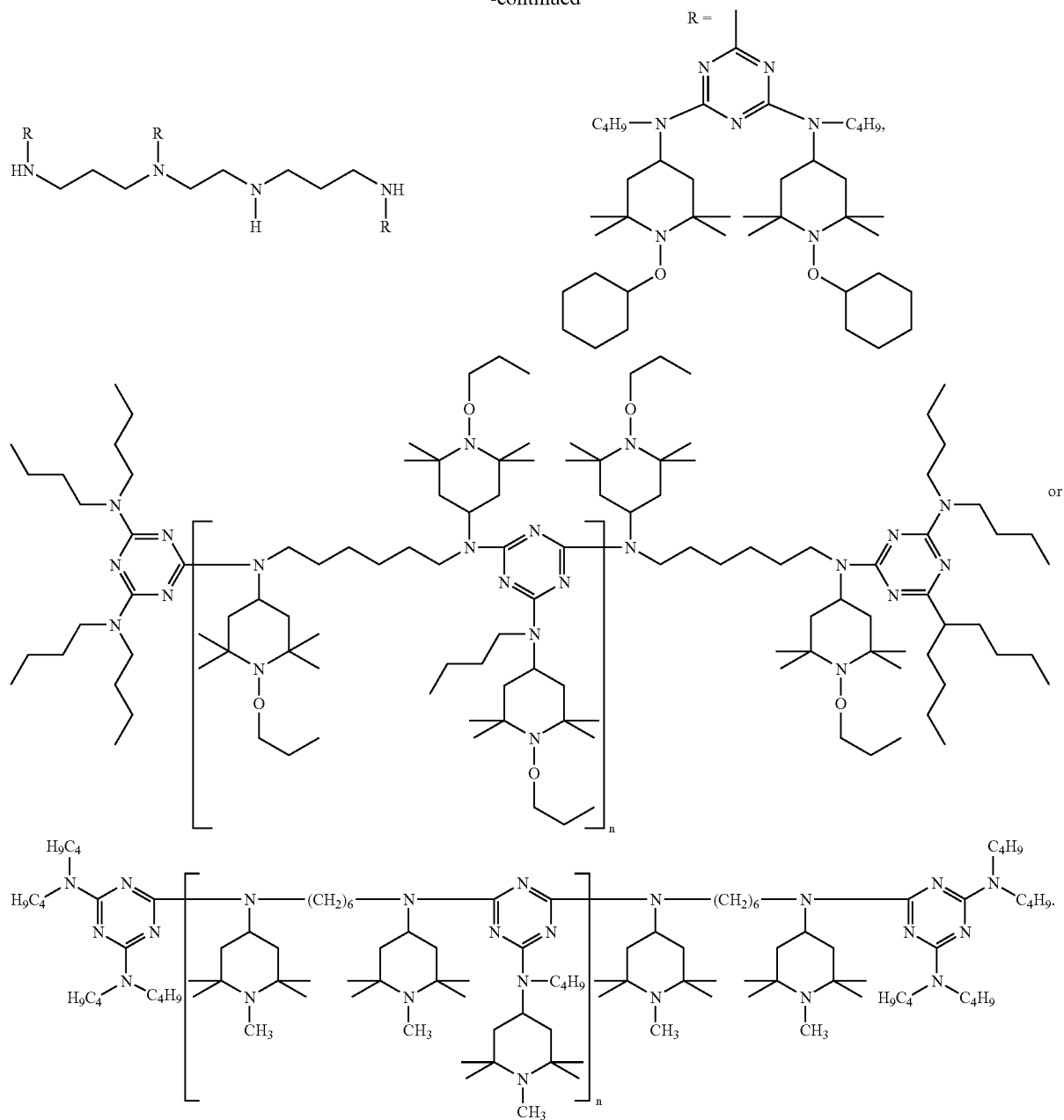
wherein m and n are integers such that the total molecular weight is above about 1000 g/mole.
7. A polyolefin composition according to claim 1 comprising iv) at least one organic phosphorus stabilizer of the formulae (1), (2), (3), (4), (5), (6) and (7)
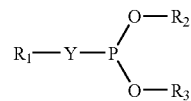
(1)
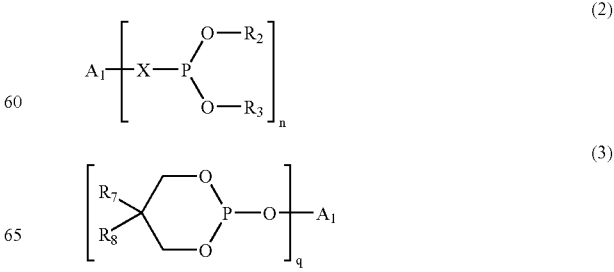

-continued

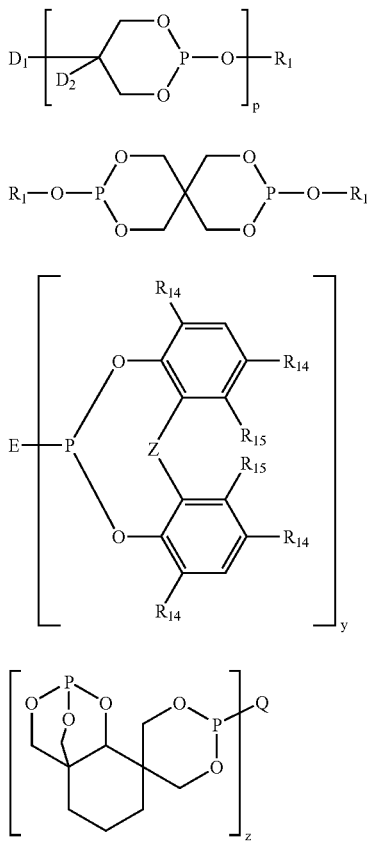

in which the indices are integral and n is 2,3 or 4; q is 1 or 2; r is 2 or 3; r is 4 to 12; y is 1, 2 or 3; and z is 1 to 6;

$A_1$, if n is 2, is $C_2$-$C_{18}$ alkylene; $C_2$-$C_{12}$ alkylene interrupted by oxygen, sulfur or —$NR_4$—; a radical of the formula, or phenylene;

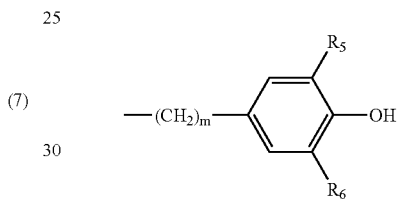

$A_1$, if n is 3, is a radical of the formula —$C_rH_{2r-1}$—;

$A_1$, if n is 4, is

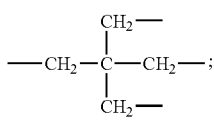

$A_2$ is as defined for $A_1$ if n is 2;

B is a direct bond, —$CH_2$—, —$CHR_4$—, —$CR_1R_4$—, sulfur, $C_5$-$C_7$ cycloalkylidene, or cyclohexylidene which is substituted by from 1 to 4 $C_1$-$C_4$ alkyl radicals in position 3, 4 and/or 5;

$D_1$, if p is 1, is $C_1$-$C_4$ alkyl and, if p is 2, is —$CH_2OCH_2$—;

$D_2$, if p is 1, is $C_1$-$C_4$ alkyl;

E, if y is 1, is $C_1$-$C_{18}$ alkyl, —$OR_1$ or halogen;

E, if y is 2, is —O—$A_2$—O—,

E, if y is 3, is a radical of the formula $R_4C(CH_2O—)_3$ or $N(CH_2CH_2O—)_3$;

Q is the radical of an at least z-valent alcohol or phenol, this radical being attached via the oxygen atom to the phosphorus atom;

$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

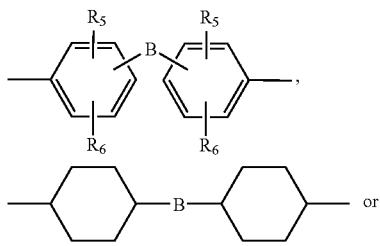

in which m is an integer from the range 3 to 6;

$R_4$ is hydrogen, $C_1$-$C_{18}$ alkyl, $C_5$-$C_{12}$ cycloalkyl or $C_7$-$C_9$ phenylalkyl, $R_5$ and $R_8$ independently of one another are hydrogen, $C_1$-$C_8$ alkyl or $C_5$-$C_8$ cycloalkyl, $R_7$ and $R_8$, if q is 2, independently of one another are $C_1$-$C_4$ alkyl or together are a 2,3-dehydropentamethylene radical; and $R_7$ and $R_8$, if q is 3, are methyl;

$R_{14}$ is hydrogen, $C_1$-$C_9$ alkyl or cyclohexyl, $R_{15}$ is hydrogen or methyl and, if two or more radicals $R_{14}$ and $R_{15}$ are present, these radicals are identical or different, X and Y are each a direct bond or oxygen, Z is a direct bond, methylene, —$C(R_{16})_2$—or sulfur, and $R_{16}$ is $C_1$-$C_8$ alkyl.

8. A polymer composition according to claim 7 in which the organic phosphorus stabilizers are selected from the group consisting of triphenyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxypentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphosphocin, bis(2,4-di-tert-butyl-6-methylphenyl) methyl phosphite, bis(2,4-di-tert-butyl-6-methylphenyl) ethyl phosphite and 2,2', 2"-nitrilo[triethyltris(3,3'5,5'-tetra-tert-butyl-1,1'- biphenyl-2,2'-diyl)phosphite],

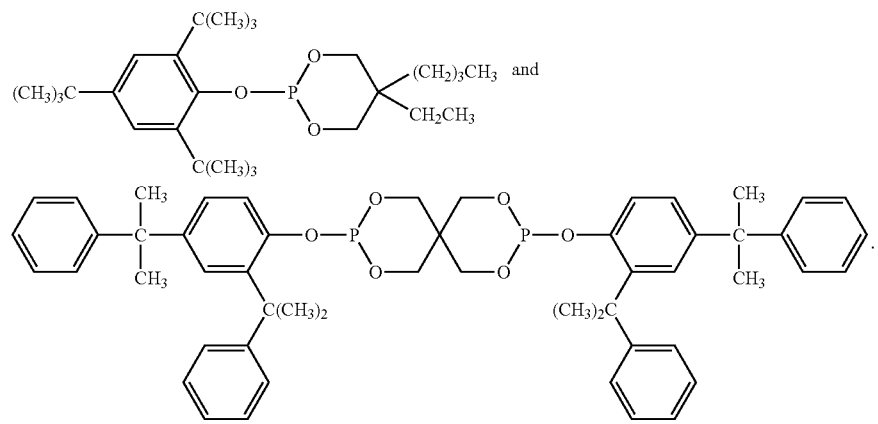

9. A polyolefin composition according to claim 7 in which the organic phosphorus stabilizer iv) is tris(2,4-di-tert-butylphenyl) phosphite.

10. A polyolefin composition according to claim 1 which additionally has incorporated therein at least one coadditive selected from the group consisting of UV absorbers, thiosynergists, metal stearates, nucleating agents, fillers, reinforcing agents, lubricants, emulsifiers, dyes, pigments, optical brighteners, flame retardants, antistatic agents, blowing agents, polyethylene oxide waxes and mineral oil.

11. An article of manufacture comprising a polyolefin composition according to claim 1 which is selected from the group consisting of woven fibers, non-woven fibers, films and molded articles.

* * * * *